United States Patent [19]

Settle et al.

[11] 3,957,532
[45] May 18, 1976

[54] METHOD OF PREPARING AN ELECTRODE MATERIAL OF LITHIUM-ALUMINUM ALLOY

[75] Inventors: Jack L. Settle, Plainfield; Kevin M. Myles, Downers Grove; James E. Battles, Oak Forest, all of Ill.

[73] Assignee: The United States of America as represented by the United States Energy Research and Development Administration, Washington, D.C.

[22] Filed: June 20, 1974

[21] Appl. No.: 481,285

[52] U.S. Cl. .............................. 136/75; 29/192 R; 75/.5 R; 75/.5 R; 75/134 A; 75/138; 136/120 R; 264/111
[51] Int. Cl.² ...................................... H01M 4/18
[58] Field of Search ............... 75/138, 134 A, .5 R, 75/.5 B; 136/120 R, 120 FC, 75; 264/111, 5, 6; 29/192 R

[56] References Cited
UNITED STATES PATENTS
3,563,730  2/1971  Bach et al. .................... 75/134 A

*Primary Examiner*—R. Dean
*Attorney, Agent, or Firm*—Dean E. Carlson; Arthur A. Churm; Hugh W. Glenn

[57] ABSTRACT

A solid compact having a uniform alloy composition of lithium and aluminum is prepared as a negative electrode for an electrochemical cell. Lithium losses during preparation are minimized by dissolving aluminum within a lithium-rich melt at temperatures near the liquidus temperatures. The desired alloy composition is then solidified and fragmented. The fragments are homogenized to a uniform composition by annealing at a temperature near the solidus temperature. After comminuting to fine particles, the alloy material can be blended with powdered electrolyte and pressed into a solid compact having the desired electrode shape. In the preparation of some electrodes, an electrically conductive metal mesh is embedded into the compact as a current collector.

9 Claims, 1 Drawing Figure

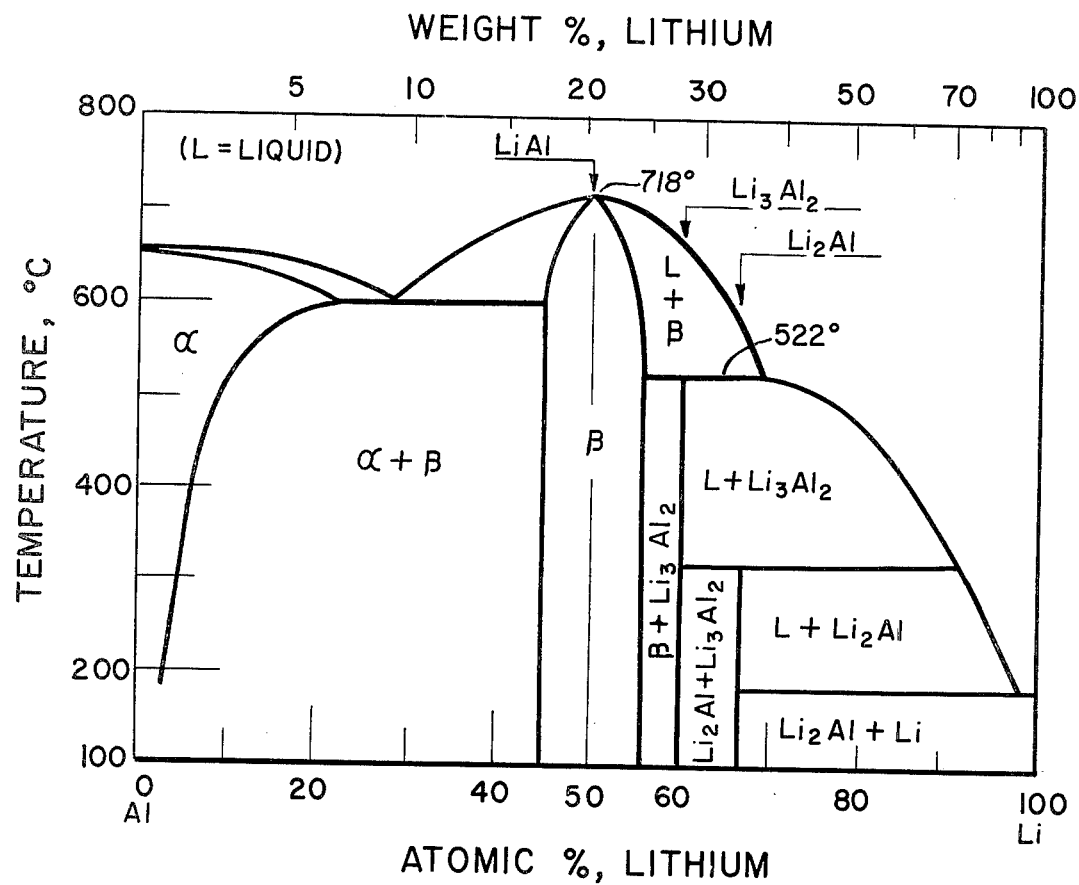

METHOD OF PREPARING AN ELECTRODE MATERIAL OF LITHIUM-ALUMINUM ALLOY

CONTRACTUAL ORIGIN OF THE INVENTION

The invention described herein was made in the course of, or under, a contract with the United States Atomic Energy Commission.

BACKGROUND OF THE INVENTION

This invention relates to methods for preparing anodes, that is negative electrodes, for use within secondary electrochemical cells. More particularly, it relates to the preparation of lithium-aluminum alloy for use in such electrodes. Electrochemical cells employing electrodes of this type are being developed to provide high current and capacity densities, high specific energy and power and long cycle life. These cells have application for battery power sources in electric or hybrid automobiles or for the storage of electric power generated by electric utility during periods of off-peak usage.

A substantial amount of work has been done in the development of high-temperature electrochemical cells and associated electrodes for meeting these applications. The cells showing the most promise employ alkali-metal negative electrodes, such as lithium or sodium or alloys including these metals, molten-salt electrolytes containing the alkali metal ions, and positive electrode materials synthesized from the chalcogen and halogen group elements. Possible materials for use in the positive electrode include not only reactants in elemental form but also compounds such as $FeS_2$ and $FeS$. Examples of such secondary cells and their various components are disclosed in U.S. Pats. No. 3,716,409 to Cairns et al. entitled "Cathodes for Secondary Electrochemical Power Producing Cells," Feb. 13, 1973; 3,666,560 to Cairns et al. entitled "Electrochemical Power Producing Cell," May 30, 1972; and 3,488,221 to Hiroshi Shimotake et al., Jan. 6, 1970; as well as U.S. Pat. No. 3,907,589 to Gay and Martino entitled "Cathode for a Secondary Electrochemical Cell," Sept. 23, 1975; all assigned to the assignee of the present application.

Investigations of lithium and lithium-aluminum alloys have revealed that these materials offer promise as negative-electrode reactants within a high-energy cell. A lithium metal negative electrode has a higher chemical activity than the alloy and will accordingly produce a slightly higher electrical potential. Elemental lithium is molten much below the 350°–450°C. temperature range where the presently considered electrochemical cells are most often operated. Negative electrodes employing elemental lithium have been prepared with matrices of steel, carbon or other inert material impregnated with the molten metal. Even so, molten elemental lithium tends to excape from the negative-electrode structure and form direct paths for electronic conduction between the electrodes.

The use of solid lithium-aluminum alloy has been suggested to avoid the containment problems associated with molten lithium. However, electrodes of lithium-aluminum alloy offer an electrical potential of about three tenths of a volt, depending on lithium concentration, less than the elemental lithium electrodes. Also, the ampere-hour capacities and the maximum charge and discharge rates per unit volume of lithium-aluminum electrode have generally fallen below those obtainable with the elemental lithium electrodes. These shortcomings of the lithium-aluminum electrode in respect to the elemental lithium electrode can be minimized by employing the maximum practical composition of lithium that can be maintained within a solid alloy.

Previous development efforts on the lithium-aluminum alloy electrode have been based primarily on electrochemically depositing lithium onto a substrate of aluminum metal. After formation it has been necessary to precondition the electrode by initially operating through a number of cycles of slow charge and discharge. When the initial cycles are carried out too rapidly, regions of liquid metal alloy, resulting in pitting of the electrode, can be produced. (For example, see U.S. Pat. No. 3,445,288 to Buzzelli, "Aluminum Anode Electrical Energy Storage Device," assigned to Standard Oil Company, Cleveland, Ohio, May 1969.)

In an effort to minimize or eliminate the need for the lengthy preconditioning steps, other workers investigated the use of a porous aluminum substrate for receiving the lithium electrodeposition. Efforts of this type are described by Walsh et al. in U.S. patent application Ser. No. 416,311, "Modular Electrochemical Cell," filed Nov. 15, 1973, now U.S. Pat. No. 3,887,396 assigned to the assignee of the present application; and in "High Performance Batteries for Off Peak Energy Storage," Progress Report for the period January – June 1973, ANL-8038, March 1974. In these latter efforts various commercially available, porous aluminum plaques were employed as substrates. The substrates included compacted fiber disks, wire disks, aluminum foam, and sintered aluminum powder plaques. The lithium-aluminum alloy formation involved electrically discharging and charging a Li(Al)-/Li cell (about 0.3 volt) either at gradually increasing currents or at a constant current. At least two or three lengthy cell cycles, about 10–40 hours each depending on size, were required in which lithium was deposited onto the aluminum substrate during the discharge, and lithium was removed from the alloy during the cell charge. Formation cells of this type are operated at a sufficiently high temperature, e.g. 400°–450°C., to maintain the electrolyte of LiCl/KCl eutectic salt in a molten state. Ordinarily this technique is successful in preparing lithium-aluminum alloys having 40 to 45 but no more than about 50 atom percent lithium. Alloys greater than 50 atom percent lithium involve substantial risk of molten alloy formation with the resulting loss of reactant and degradation of the substrate.

Another problem in the use of electrochemically prepared lithium-aluminum electrodes is in dimensional stability. The aluminum substrates have been found to expand during the alloy formation and preconditioning steps. The expansion is attributed to excessive lithium influx into the substrate interstices and to nonuniform electrodeposition and reaction of lithium throughout the substrate.

In the preparation of lithium-aluminum alloys by metallurgical techniques, care must be taken to avoide loss of lithium by evaporation or its contamination by chemical reaction at the elevated temperatures. It can be seen by examining the binary phase diagram of the lithium-aluminum system shown in the figure that temperatures of up to 718°C., for 50–50 atom percent lithium-aluminum, are required to produce a completely molten mixture. At these temperatures elemental lithium is quite reactive and exerts a significant vapor pressure.

On solidifying a molten mixture of most lithium and aluminum compositions in excess of 50 atom percent lithium, a two-phase mixture of liquid and solid is first formed. The temperature for a particular composition at which freezing begins on cooling and melting ends on heating is termed the liquidus temperature. Similarly the temperature at which freezing ends on cooling and melting begins on heating is termed the solidus temperature. These temperatures are represented by solid lines in the equilibrium phase diagram of the FIGURE, with the letter L used to signify regions in which the liquid phase is present at equilibrium. For concentrations between about 50 and 70 atom percent lithium, a two-phase region of liquid and solid is represented by the spherical triangle above 522°C. in the FIGURE labeled as including liquid and beta ($\beta$) particles. For concentrations in excess of about 56 percent lithium, cooling can continue to 522°C. without complete solidification. On further cooling, particles of the lithium-aluminum beta ($\beta$) composition react with the lithium-rich liquid to form $Li_3Al_2$. This lithium-rich compound will often coat the solid particles and thereby isolate domains of aluminum-rich composition out of contact with the liquid. Consequently, the solidified mixture can be heterogeneous with regions of beta composition disbursed throughout regions having elevated lithium concentrations. On using a nonuniform lithium-aluminum alloy of this type as an electrode within an electrochemical cell operating at 350°C. to 450°C., lithium-rich portions of the electrode can become molten and be lost into the electrolyte.

It was previously believed that the lithium-aluminum compound formed at the peritectic temperature of 522°C. was $Li_2Al$ rather than $Li_3Al_2$. (Investigators have determined that the lithium-aluminum compound having approximately twice the atomic concentration of lithium as aluminum is more accurately designated $Li_9Al_4$. For the purpose of this application, this compound shall continue to be designated $Li_2Al$.) Many lithium-aluminum phase diagrams found in the literature will show a region of solid alloy mixture of beta and $Li_2Al$ rather than $Li_3Al_2$ up to 522°C. This region extends to nearly 70 atom percent lithium (see Hansen and Anderko, *Constitution of Binary Alloys*, page 1, McGraw-Hill, 1958).

The lithium-aluminum phase, $Li_3Al_2$, was discovered only a short time ago (see Tebbe et al., "Eine Neue Phase Im System Li/Al", *Zeifschr. F. Naturf. Tl* 6, 286, pp. 600–605, 1973). Taking this new phase into account, the temperature-composition parameters within the region of 56–70 atom percent lithium are believed to be more accurately represented by the diagram of the FIGURE than those previously given in the literature. As can be seen from the FIGURE, completely solid mixtures of lithium-aluminum phases do not exist above 60 atom percent lithium within the desired cell operating temperature range of 350°–450°C. As shown in the FIGURE, the solidus temperature for lithium compositions of above 60 to nearly 70 atom percent is about 320°C. Accordingly, the inventors have devised new methods of preparing negative electrodes to take these discoveries into account.

Therefore, in view of the above, it is an object of the present invention to provide a method of preparing an essentially uniform alloy of lithium and aluminum that will remain solid at the cell-operating temperature for use as an electrode within a high-temperature electrochemical cell of high specific energy and capacity.

It is also an object to provide a method of preparing a solid lithium-aluminum electrode having in excess of 50 atom percent lithium without employing lengthy electrochemical processes.

It is a further object to provide an essentially uniform and dimensionally stable electrode composition of about 50–60 atom percent lithium and 40–50 atom percent aluminum.

SUMMARY OF THE INVENTION

In accordance with the present invention, a method of producing an electrode material for use within a high-temperature and high specific energy electrochemical cell is provided. The electrode comprises a uniform alloy composition of lithium and aluminum having at least 50 atom percent lithium. The alloy is prepared by melting lithium metal at a temperature substantially below the liquidus temperature of the intended alloy composition. Solid aluminium is dissolved in the melt while increasing the temperature at a sufficiently high rate to maintain a liquid phase until the intended aluminum concentration is reached. After sufficient aluminum is included in the melt, the temperature is elevated above the liquidus temperature at the intended alloy composition with agitation to insure dissolution of the remaining aluminum. The melt is rapidly solidified by splat casting onto a surface to minimize development of non-homogeneous regions. The solid is heated to a temperature just below the solidus temperature at which liquid formation begins and maintained at that temperature for a sufficient period to complete chemical homogenization. The homogenized solid is comminuted to particles. The particles can be pressed to form a compact of the desired alloy composition having essentially uniform lithium-aluminum distribution.

BRIEF DESCRIPTION OF THE DRAWING

The FIGURE is an equilibrium, binary phase diagram of the lithium-aluminum alloy system.

DETAILED DESCRIPTION OF THE PREFERRED EMBODIMENTS

In preparing a lithium-aluminum electrode by molten metallurgical techniques, special precautions must be taken. Particularly, vaporization or reaction of the lithium metal during formation must be prevented and a closely defined procedure must be followed in order to obtain a uniform and homogenous alloy. In forming a melt containing the desired alloy proportions, a preliminary melt of mostly lithium is prepared. As can be seen from the binary phase diagram in the figure, lithium becomes molten at a little less than 200°C. Since lithium is an extremely reactive metal, a crucible containing the melt is maintained under a cover of inert gas; for example, argon or helium. Lithium readily combines with oxygen, nitrogen, or the moisture in the air, and each of such reactions is accelerated at the elevated temperatures of the present method. In addition, lithium begins to exert a significant vapor pressure at about 300°C. Therefore, to prevent contamination of the molten metal from dilute contaminants within the inert gas and to prevent loss by vaporization, the temperature and the length of time at elevated temperatures is preferably minimized.

To reduce the activity of the melt at these elevated temperatures, aluminum dissolution should be begun at temperatures below 300°C. High-purity aluminum having a known mass is incorporated into the lithium melt to form a molten, master alloy. As the aluminum concentration increases, the temperature of the melt is increased by just enough to prevent bulk solidification of the alloy. Temperatures in excess of 10°C. above the liquidus temperature for the molten alloy composition are preferably avoided to minimize lithium vaporization. Thus, the increase in temperature and in aluminum concentration of the molten, master alloy roughly follows the equilibrium liquidus line shown in the FIGURE from pure lithium to the desired lithium-aluminum alloy concentration.

The method of the present development can be used to prepare a broad range of alloy compositions, for instance, between 30 and 90 atom percent lithium. As will be seen hereinbelow, this method has particular application in the preparation of alloys having between 50 and 60 atom percent lithium. It is with these lithium concentrations and above where considerable difficulties have been encountered in preparing a uniform solid alloy of lithium and aluminum by the electrochemical method.

One initial aspect for providing uniformity throughout the electrode alloy is to ensure a homogeneous blend of the molten material. This is accomplished by rapidly raising the temperature of the completed melt to a temperature of about 30°C. above the liquidus temperature at the desired alloy composition. A thorough blending by suitable mechanical means is performed at this point.

The melt is then rapidly solidified by casting a thin layer or puddle supported only by the liquid surface tension onto a cold smooth surface. For this purpose, a slab of stainless steel at about 20°C. can be employed to solidify the melt within about 20 seconds. Other techniques that will effect similar rapid cooling can also be used, as the shape of this preliminary splat casting is unimportant.

The inventors have found after numerous splat castings as described above that a macroscopically uniform distribution of lithium and aluminum throughout is obtained However, at a microscopic level some phases rich in lithium and others having more than the compositional amounts of aluminum are produced.

One explanation for this microscopic heterogeneity can be seen with reference to the binary phase diagram shown in the FIGURE. Melts of lithium-aluminum alloy having between 50 and 70 atom percent lithium will solidify by first forming particles of beta alloy within a liquid melt of enriched lithium concentration. This mixture is illustrated in the phase diagram by the region shaped as a spherical triangle above 522°C. and between 50 and 70 atom percent lithium. As solidification continues, the particles of beta alloy deviate from the equilibrium composition defined by the solidus line and tend to have excess aluminum, while the composition of the liquid deviates from that defined by the liquidus line and tend to have excess lithium. At the peritectic reaction temperature of 522°C. at the base of the triangle, the liquid reacts with the beta particles to form $Li_3Al_2$ coatings on the particles and thereby inhibit equilibration of the particles with the liquid. The practical consequences are that the last liquid melt to solidify wil contain a substantial excess of lithium, thus producing metallic regions within the casting which have extremely low melting points, possibly as low as 170°C. On employing such castings as electrodes within a high-temperature electrochemical cell at temperatures of, for instance, 350°–450°C., these regions become molten and allow substantial lithium losses as well as impair the electrode structure.

Splat castings as described above are broken into coarse fragments by conventional crushing techniques and heated to a temperature near to but slightly below the solidus temperature of the over-all alloy composition. For alloy compositions between 56 and 60 atom percent lithium, this corresponds to the peritectic reaction line at about 522°C. In this instance, a temperature of about 500°C. held for about one hour has been found to be suitable in bringing about substantial homogenization of the fragments. At lower lithium concentrations down to equal atomic portions of lithium and aluminum, higher annealing temperatures are used. For instance, at 50 atom percent lithium an annealing temperature of about 700°C. is employed.

After conventional annealing step, the homogenized fragments are further comminuted by conventional crushing and grinding techniques into particles of less than about 500 microns in diameter. The homogenized particles are then pressed within a die of the desired shape, e.g. disk or plate-shaped, to form a lithium-aluminum compact. In compressing the particles, a mesh of inert, but electrically conductive, metal such as stainless steel or molybdenum can be included within the die and thereby become embedded within the compact to enhance current collection and provide enhanced structural stability. In addition, particles of solid electrolyte, e.g. a suitable alkali metal salt such as LiCl/KCl eutectic, can be blended with the homogenized lithium-aluminum particles and infused into the electrode by hot pressing at a temperature of above the melting temperature of the electrolyte. The inclusion of an electrolyte insures intimate electrolyte-reactant contact throughout the electrode during cell operation.

Compacts made in this manner are substantially complete for use as electrodes within a cell. Electrical contact can be made by firmly positioning the compact as an electrode against the cell housing. In other instances, threaded, soldered or compression-type terminals can be attached to the electrode and to the metal mesh current collector. In some cases, it is desirable to form the electrode with a cental opening for connection of a terminal or for passage of a terminal to another electrode within a stack.

The following examples are presented to illustrate the method of the present invention.

EXAMPLE I

A weighed charge of lithium metal was melted within a tantalum crucible and heated to about 300°C. An aluminum rod of sufficient weight to form a 50–50 atom percent lithium-aluminum alloy was placed in the melt and allowed to dissolve and react. During dissolution the temperature was gradually increased at a sufficient rate to maintain a liquid phase in contact with the solid. Expressed differently, a liquid phase was maintained which closely followed the liquidus temperature, within about 10°C., as the aluminum concentration was increased within the melt from 0 to 50 atom percent. After most of the aluminum had dissolved and the temperature was raised to the liquidus temperature corresponding to the desired alloy composition, that is 718°C., the melt was superheated about 30°C. more and mechanically agitated for a period of about 5 minutes to insure a homogeneous molten mixture. A plaque of about 0.5 cm thickness was next formed by splat casting the melt onto a smooth slab of stainless steel at about 20°C. After cooling, the plaque was broken into fragments of roughly a centimeter in size and placed into a fresh tantalum crucible for reheating. The fragments were heated to about 700°C. and held at that temperature for 1 hour to complete homogenization. After cooling to room temperature, the fragments were mechanically ground to particles having an average size of between 100 and 500 micrometers. An amount of LiCl/KCl eutectic equal to about 20 weight percent of the total was blended with the particles and the mixture pressed within a mold at 4000 psi and 350°–450°C. for about 2 minutes in order to form a compact.

Two compacts prepared as in Example I were assembled on opposite sides of a $FeS_2$ electrode structure within an electrolytic cell. Each negative electrode was disk-shaped with a surface area of about 20 cm² and made electrical contact with the cell housing to which the negative terminal of the cell was attached. The cell was operated for over 1300 hours and 125 charge and discharge cycles. During this period only a minor portion of the lithium-aluminum alloy was lost from the electrode. The utilization of lithium within the initial cycles was about 67 percent at a charge cutoff voltage of 2.3 and a current density of 0.024 amp/cm². After 4 weeks of continuous operation, the utilization had decreased to 44 percent of lithium within the electrodes.

EXAMPLE II

Several other electrodes were prepared as in Example I with 50 atom percent lithium and 50 atom percent aluminum, except the compacts were prepared of particles having a distribution of between 44 and 74 microns size. An electrochemical cell was assembled with a stack of four disk-shaped negative electrodes of this type in alternating sequence with five parallel positive electrodes containing $FeS_2$. Each negative electrode had a surface ared 20 of about area cm² The cell was operated for over 2,000 hours and 200 cycles, during which time it was required to replace one of the four anodes which disintegrated into the electrolyte. Otherwise the cell performed well for most of this period with a percent utilization of lithium generally above 50 percent until the last cycles. The cell was operated at 0.0025 to 0.0088 amp/cm² with a cutoff of 0.5 to 0.7 volt on discharge and at 0.0013 to 0.025 amp/cm² with a cutoff voltage of 1.6 to 2.3 volts on charge.

EXAMPLE III

Additional particles of alloy were prepared in essentially the same manner as described in Example I except that the alloy mixture included 60 atom percent lithium and 40 percent aluminum. Accordingly, the mixture was annealed at slightly below the solidus temperature for this particular concentration, e.g. at about 500°C. for 1 hour. Differential thermal analysis on particles of this mixture disclosed no phase richer in lithium content than $Li_3Al_2$, thus indicating that a substantially homogeneous powder had been formed.

By using similar techniques, an alloy containing 65 atom percent lithium and 35 atom percent aluminum was prepared. Differential thermal analysis showed the existence of both $Li_3Al_2$ and $Li_2Al_1$ (that is $Li_9Al_4$). In addition, alloy of this composition had a solidus temperature of about 320°C. as shown in the FIGURE, thus illustrating that alloys in excess of 60 percent lithium will include a liquid phase at cell operating temperatures of 350°–450°C.

It can be seen from the above examples and description that the present invention provides a method for preparing a solid and uniform lithium-aluminum alloy, even with compositions in excess of 50 atom percent lithium, for use as an electrode within an electrochemical cell. It is also seen that alloy compositions comprising about 56 to 60 atom percent lithium will maximize the amount of lithium that can be contained in solid form within an electrode at cell operating temperatures above 350°C. Electrodes as thus prepared have potential for providing high energy utilization and long lives within secondary electrochemical cells.

The embodiments of the invention in which an exclusive property or privilege is claimed are defined as follows:

1. A method of preparing a uniform alloy composition of lithium and aluminum having at least 50 atom percent lithium for use as negative electrode material in a high-temperature electrochemical cell comprising:
   melting lithium metal at a temperature substantially below the liquidus temperature of said alloy composition;
   dissolving aluminum within the molten lithium while continuously increasing temperature with increasing aluminum concentration to maintain a liquid phase until a melt of said alloy composition is produced;
   solidifying said melt by splat casting onto a surface;
   breaking said solidified melt into fragments;
   heating said fragments to a temperature near to but below the solidus temperature of said alloy composition to homogenize said fragments; and
   comminuting said homogenized fragments to particles.

2. The method of claim 1 wherein said melt of lithium-aluminum is controlled at temperatures of up to 10°C. above corresponding liquidus temperatures during increasing aluminum concentration and elevated to about 30°C. above the liquidus temperature when the aluminum concentration of said alloy composition is reached.

3. The method of claim 1 wherein said solidified melt is heated to a temperature about 20°C. below the solidus temperature of said alloy composition and maintained at that temperature for a period of about 1 hour.

4. The method of claim 1 wherein said solidified melt is comminuted to particles of less than 500 microns in size and blended with an electrolyte of alkali metal salts and pressed into a compact of essentially uniform lithium-aluminum distribution.

5. The method according to claim 4 wherein a mesh of electrically conductive and chemically inert metal is embedded into said compact during said pressing step.

6. An electrode including an essentially uniform alloy composition of 56–60 atom percent lithium and 40–44 atom percent aluminum prepared by the process of claim 5.

7. A compact for use as a negative electrode within a high-temperature electrochemical cell comprising a uniform alloy composition of 50–60 atom percent lithium and 40 to 50 atom percent aluminum prepared by the method of claim 4.

8. A compact for use as a negative electrode within a high-temperature electrochemical cell comprising an essentially uniform alloy composition of 56–60 atom percent lithium and 40–44 atom percent aluminum prepared by the method of claim 4.

9. The compact of claim 8 wherein said alloy composition consists essentially of $Li_3Al_2$.

* * * * *